(12) United States Patent
Hassan et al.

(10) Patent No.: US 10,939,354 B2
(45) Date of Patent: *Mar. 2, 2021

(54) CONNECTIVITY USING A GEOGRAPHIC PHONE NUMBER

(71) Applicant: Microsoft Technology Licensing, LLC, Redmond, WA (US)

(72) Inventors: Amer Aref Hassan, Kirkland, WA (US); David Michael Halley, Seattle, WA (US); Russell Andrew Penar, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,521

(22) Filed: Sep. 25, 2019

(65) Prior Publication Data

US 2020/0022058 A1    Jan. 16, 2020

Related U.S. Application Data

(63) Continuation of application No. 16/181,243, filed on Nov. 5, 2018, now Pat. No. 10,517,035, which is a
(Continued)

(51) Int. Cl.
*H04W 40/20* (2009.01)
*G06F 16/487* (2019.01)
(Continued)

(52) U.S. Cl.
CPC .......... *H04W 40/20* (2013.01); *G06F 16/487* (2019.01); *H04M 3/4228* (2013.01);
(Continued)

(58) Field of Classification Search
CPC ... H04W 40/20; H04W 64/006; G06F 16/488; G06F 16/487; H04M 3/4228;
(Continued)

(56) References Cited

U.S. PATENT DOCUMENTS 9,215,169 B2 * 12/2015 LaCroix .................. H04L 45/74
10,165,495 B1 * 12/2018 Hassan ................. G06F 16/487
(Continued)

FOREIGN PATENT DOCUMENTS

| CN | 101516080 A | 8/2009 |
| CN | 102202373 A | 9/2011 |
| CN | 102598733 A | 7/2012 |

OTHER PUBLICATIONS

"Non Final Office Action Issued in U.S. Appl. No. 16/453,612", dated Oct. 21, 2019, 8 Pages.
(Continued)

*Primary Examiner* — Diane D Mizrahi
(74) *Attorney, Agent, or Firm* — Schwegman Lundberg & Woessner, P.A,

(57) ABSTRACT

Techniques for connectivity using a geographic phone number are described. According to various implementations, techniques described herein enable various policies pertaining to the use of telephone numbers at different locations to be enforced. For instance, techniques described herein enable a client device that is outside of a permitted geographic area for a geographic phone number to use a non-geographic phone number to connect a call, while the call can be routed using the geographic phone number.

20 Claims, 8 Drawing Sheets

Related U.S. Application Data continuation of application No. 15/630,247, filed on Jun. 22, 2017, now Pat. No. 10,165,495.

(51) Int. Cl.
*H04M 3/42* (2006.01)
*H04M 7/12* (2006.01)
*H04W 64/00* (2009.01)

(52) U.S. Cl.
CPC .... *H04M 3/42348* (2013.01); *H04M 3/42059* (2013.01); *H04M 3/42306* (2013.01); *H04M 7/128* (2013.01); *H04M 2215/7259* (2013.01); *H04M 2242/14* (2013.01); *H04W 64/006* (2013.01)

(58) Field of Classification Search
CPC ......... H04M 3/42348; H04M 3/42306; H04M 2242/14; H04M 2215/7259; H04M 3/42059; H04M 7/128
See application file for complete search history.

(56) References Cited

U.S. PATENT DOCUMENTS

| | | | |
|---|---|---|---|
| 10,182,154 B2 * | 1/2019 | Pickering | G06Q 10/10 |
| 10,517,035 B2 * | 12/2019 | Hassan | G06F 16/487 |
| 2014/0269391 A1 | 9/2014 | Hansen et al. | |
| 2020/0015060 A1 * | 1/2020 | Hassan | H04W 4/02 |

OTHER PUBLICATIONS

U.S. Appl. No. 15/630,247, U.S. Pat. No. 10,165,495, filed Jun. 22, 2017, Connectivity Using a Geographic Phone Number.
U.S. Appl. No. 16/181,243, U.S. Pat. No. 10,517,035, filed Nov. 5, 2018, Connectivity Using a Geographic Phone Number.
U.S. Appl. No. 16/582,473, filed Sep. 25, 2019, Connectivity Using a Geographic Phone Number.
"Non Final Office Action Issued in U.S. Appl. No. 16/582,473", dated Mar. 2, 2020, 14 Pages.
"First Office Action and Search Report Issued in Chinese Patent Application No. 201880041174.9", dated Aug. 28, 2020, 27 Pages.

* cited by examiner

CONNECTIVITY USING A GEOGRAPHIC PHONE NUMBER

CROSS REFERENCE TO RELATED APPLICATIONS

This application is a continuation of, and claims priority to, U.S. application Ser. No. 16/181,243, filed Nov. 5, 2018, and entitled "Connectivity Using a Geographic Phone Number," which is a continuation of U.S. patent application Ser. No. 15/630,247, filed Jun. 22, 2017, and entitled "CONNECTIVITY USING A GEOGRAPHIC NUMBER." The contents of these prior applications are considered part of this application, and are hereby incorporated by reference in their entirety.

BACKGROUND

Today's mobile devices provide users with a tremendous amount of portable functionality. For instance, smartphones, tablets, laptops, and so on, enable users to perform a variety of different tasks without being tied to a particular location. The ability to engage in various types of communication in a mobile scenario is particularly useful. A mobile device, for example, typically includes functionality for engaging in different types of communication with other devices and/or services, such as voice calls, video calls, messaging, and so forth. Thus, a user may leverage a mobile device to communicate with other users via a variety of different communication modalities.

While mobile devices enable communication in diverse scenarios, there are challenges to consistently enabling a user to communicate via a particular device when the user moves between geographic locations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment disclosed is a method. The method includes establishing a first session portion using Internet Protocol (IP) communication between a calling device and a communications service, establishing a second session portion using IP communication between the communications service and a PSTN switch, the second session portion addressed via a non-geographic number of the calling device, establishing a third session portion using PSTN communication and a geographic number of the calling device between a PSTN switch and a callee device, and establishing a call between the calling device and the callee device via the first session portion, second session portion, and third session portion.

In some embodiments, the method includes addressing the first session portion via the geographic number. In some of these embodiments, the method includes addressing the second session portion using a geographic number and addressing the third session portion using the geographic number. In some embodiments, the method includes determining a location of the calling device, and determining the geographic number is not permitted for use at the location, and the addressing of the second session portion via the non-geographic number is in response to the determination. In some of these embodiments, the determining that the geographic number is not permitted includes transmitting a query to a remote service, the query indicating a location of the client device, and receiving, from the remote service, a response to the query indicating that the location is not a permitted location of the geographic number. In some embodiments, the method also includes receiving a request to connect the call from the client device to the callee device. In some embodiments, the establishing the third session portion using PSTN communication includes causing the PSTN to dial the geographic number at the PSTN. In some embodiments, the establishing of the call between the calling device and the callee device includes causing a portion of the call to be routed to the client device via the non-geographic number.

Another embodiment disclosed is a system. The system includes hardware processing circuitry, and one or more hardware memories storing instructions that when executed configure the hardware processing circuitry to perform operations includes establishing a first session portion using Internet Protocol (IP) communication between a calling device and a communications service, establishing a second session portion using IP communication between the communications service and a PSTN switch, the second session portion addressed via a non-geographic number of the calling device, establishing a third session portion using PSTN communication and a geographic number of the calling device between a PSTN switch and a callee device, and establishing a call between the calling device and the callee device via the first session portion, second session portion, and third session portion.

In some embodiments, the operations further include addressing the first session portion via the geographic number. In some embodiments, the operations include addressing the second session portion using a geographic number and addressing the third session portion using the geographic number. In some embodiments, the operations include determining a location of the calling device, and determining the geographic number is not permitted for use at the location. In these embodiments, the addressing of the second session portion via the non-geographic number is in response to the determination.

In some embodiments of the system, the determining that the geographic number is not permitted includes transmitting a query to a remote service, the query indicating a location of the client device, and receiving, from the remote service, a response to the query indicating that the location is not a permitted location of the geographic number. In some embodiments, the operations also include receiving a request to connect the call from the client device to the callee device. In some of these embodiments, establishing the third session portion using PSTN communication includes causing the PSTN to dial the geographic number at the PSTN.

In some embodiments of the system, the establishing of the call between the calling device and the callee device includes causing a portion of the call to be routed to the client device via the non-geographic number.

Another embodiment disclosed is a non-transitory computer readable medium includes instructions that when executed configure hardware processing circuitry to perform operations. The operations include establishing a first session portion using Internet Protocol (IP) communication between a calling device and a communications service, establishing a second session portion using IP communication between the communications service and a PSTN switch, the second session portion addressed via a non-geographic number of the calling device, establishing a third session portion using PSTN communication and a geographic number of the calling device between a PSTN switch and a callee device, and establishing a call between the calling device and the callee device via the first session portion, second session portion, and third session portion.

In some embodiments of the computer readable medium, the operations also include determining a location of the calling device, and determining the geographic number is not permitted for use at the location. In these embodiments, the addressing of the second session portion via the non-geographic number is in response to the determination.

In some of these embodiments, the determining that the geographic number is not permitted includes transmitting a query to a remote service, the query indicating a location of the client device, and receiving, from the remote service, a response to the query indicating that the location is not a permitted location of the geographic number.

In some embodiments, the establishing of the call between the calling device and the callee device includes causing a portion of the call to be routed to the client device via the non-geographic number.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Techniques for connectivity using a geographic phone number are described. Generally, a phone number refers to a set of characters that can be used to initiate communication with a particular resource. According to various implementations, techniques described herein enable various policies pertaining to the use of telephone numbers at different locations to be enforced. For instance, a particular regulatory policy may specify that particular geographically-specific phone numbers (e.g., numbers with a particular area code) are not permitted to be used outside of a defined geographical area. Thus, techniques for connectivity using a geographic phone number enable a client device that is outside of a permitted geographic area for a geographic phone number to use a non-geographic phone number to connect a call, while the call can be routed using the geographic phone number.

The use of the term "telephone number" herein is not to be construed as limiting, and it is to be appreciated that "telephone number" may refer to any string of characters, numeric and/or textual, that may be utilized to engage in the exchange of communication media across a network and between different devices. In at least some implementations, a telephone number represents a number that can be used to route a call between an Internet Protocol (IP) network, and a Public Switched Telephone Network ("PSTN").

In the following discussion, an example environment is first described that is operable to employ techniques described herein. Next, some example scenarios are described for connectivity using a geographic phone number in accordance with one or more implementations. Following this, some example procedures are described in accordance with one or more implementations. Finally, an example system and device are described that are operable to employ techniques discussed herein in accordance with one or more implementations.

Having presented an overview of example implementations in accordance with one or more implementations, consider now an example environment in which example implementations may by employed.

Figure 1:
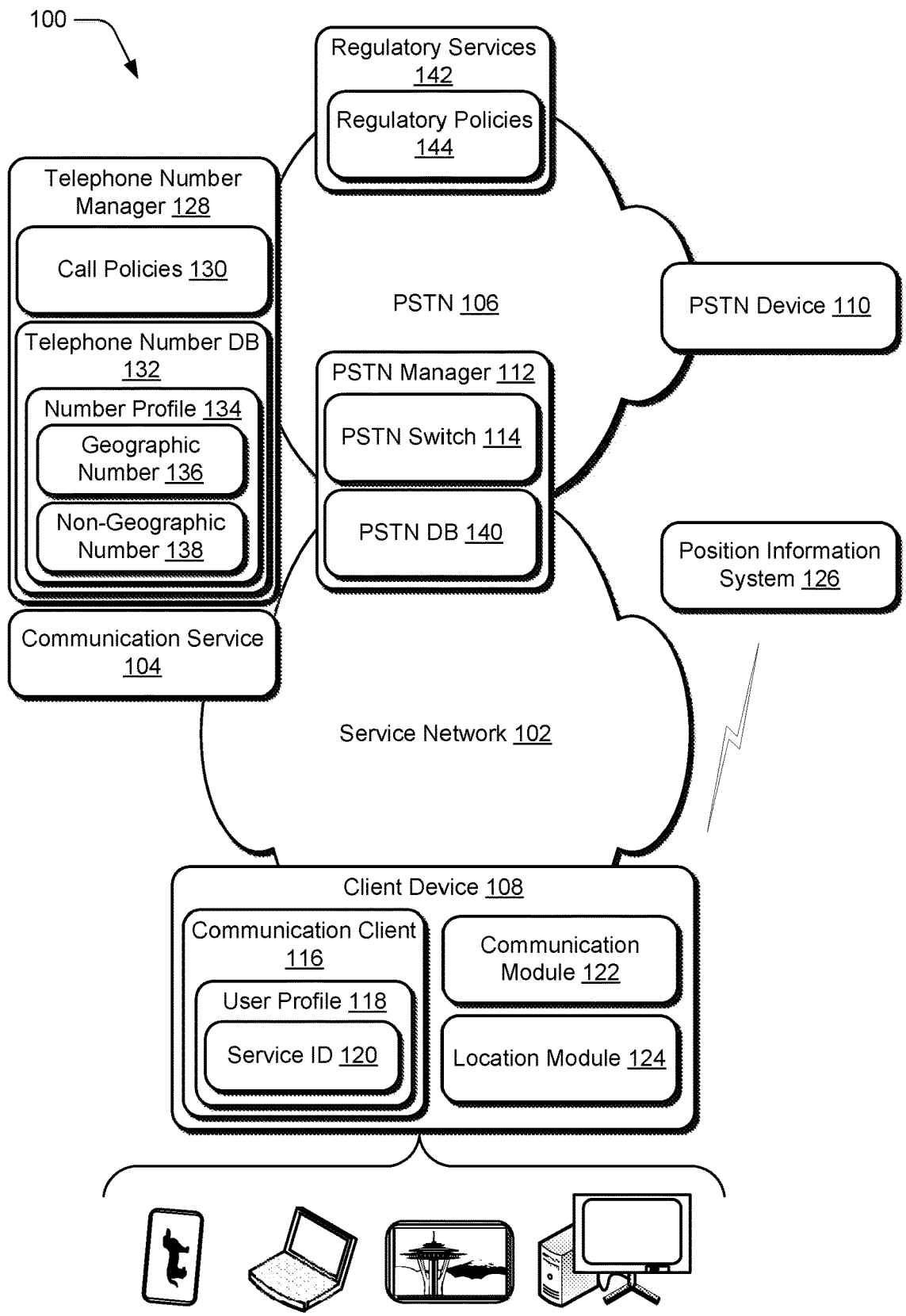
FIG. 1 is an illustration of an environment in an example implementation that is operable to employ techniques discussed herein.

FIG. 1 is an illustration of an environment 100 in an example implementation that is operable to employ techniques for connectivity using a geographic phone number described herein. The environment 100 includes a service network 102 hosted and/or managed by a communication service 104. Generally, the service network 102 is representative of wireless and/or wired connectivity that enables different forms of communication. The service network 102, for instance, represents a combination of interconnected wireless and wired networks that enable communication at various geographic locations and via a variety of different communication modalities.

The communication service 104 is representative of a service that performs various tasks for management of communication between different endpoint devices. The communication service 104, for instance, can manage initiation, moderation, and termination of communication sessions. Examples of the communication service 104 include a Voice over Internet Protocol (VoIP) service, an online conferencing service, a unified communications and collaboration (UC&C) service, and so forth.

The service network 102 is communicably connected to a Public Switched Telephone Network ("PSTN") 106 to enable communication between a client device 108 and other devices and/or services, such as a PSTN device 110. The client device 108 is representative of an end-user device configured to communicate via the service network 102. The client device 108 may be configured in a variety of ways, such as a wireless cellular phone (e.g., a smartphone), a tablet, a laptop, and so forth. One example implementation of the client device 108 is presented below as the computing device 802 of FIG. 8.

The PSTN device 110 is generally representative of a telephony-enabled device that is connected, directly or indirectly, to the PSTN network 106. The environment 100 further includes a PSTN manager 112, which represents infrastructure (e.g., hardware and logic) that enables implementation and operation of the PSTN network 106. The PSTN manager 112 includes a PSTN switch 114, which is representative of functionality for processing calls that traverse the PSTN network 106. Further functionality of the PSTN switch 114 is discussed below.

The client device 108 includes a communication client 116, which is representative of functionality to enable different forms of communication via the client device 108. Examples of the communication client 116 include a VoIP client, a video communication application, a messaging application, a content sharing application, and combinations thereof. The communication client 116, for instance, enables different communication modalities to be combined to provide diverse communication scenarios. In at least some implementations, the communication client 116 represents an application that is installed on the client device 108. Additionally or alternatively, the communication client 116 can be implemented all or in part as a remote application, such as accessed via a web browser, a web application, and so forth. According to various implementations, the communication client 116 is configured to enable various types of communication via interaction with the communication service 104.

The communication client 116 is associated with a user profile 118, which represents a way of authenticating a particular user with the communication client 116 and the communication service 104, and for tracking user-specific authentication information (e.g., username, password, and so forth), user settings, contacts, and other data for the user. In at least some implementations, the user profile 118 is portable such that the user can authenticate with a different instance of the communication client 116, and make calls via the different instance of the communication client 116 that are identified as being connected with the user profile 118. The user profile 118 is associated with a user identifier (ID) 120, which is representative of a way of identifying a user of the client device 108 to the communication service 104. In at least some implementations, the service ID 120 is used to initiate communication from the client device 108 via the communication service 104 and over the service network 102.

The client device 108 further includes a communication module 122 and a location module 124. The communication module 122 is representative of functionality for enabling the client device 108 to communicate data via wired and/or wireless connectivity to the service network 102. The location module 124 is representative of functionality receiving, transmitting, and/or processing location information. The location module 124, for instance, supports transmission, reception, and processing of position information according to a variety of different technologies, such as Global Positioning System (GPS), cellular communication, WiFi™, satellite communication, radio frequency (RF) communication, subnet information, Ethernet switch and/or port data, Internet Protocol (IP) address information, and so forth.

According to various implementations, the location module 124 can communicate with a position information system 126 to obtain position information for the client device 108. The position information system 126 is representative of various types of position information systems that can transmit and/or receive position information. Examples of the position information system 126 include GPS satellites, cellular telephone networks, wireless data (e.g., WiFi™) networks, location information services (LIS), radio frequency identifier (RFID) functionality, subnets of wired networks, Ethernet switches and/or ports, and so forth.

According to various implementations, position information can be communicated between the location module 124 and the position information system 126 to enable a location of the client device 108 to be determined. Examples of position information include GPS coordinates, street addresses, network location, location with reference to cell towers and/or cellular base stations, and so forth. Generally, techniques described herein can determine how to process calls to and from the client device 108 based on a particular location of the client device 108.

The environment 100 further includes a telephone number manager ("number manager") 128, which is representative of functionality for performing various aspects of techniques for connectivity using a geographic phone number discussed herein. For instance, the number manager 128 can determine a particular telephone number that is to be used for making and/or receiving phone calls for the client device 108 at a particular location.

Generally, the number manager 128 represents a remote service that is remote from the client device 108 and that can provide services pertaining to connectivity using a geographic phone number. The number manager 128 includes call policies 130 and a telephone number database ("number DB") 132. The call policies 130 represent different policies that can be applied to determine which telephone number is to be used for a particular device at a particular location, such as for making an outgoing call and/or receiving an incoming call.

The number DB 132 represents a database that stores different telephone numbers allocated to different devices, such as the client device 108. For instance, the number DB 132 stores telephone numbers that are to be used at different geographic locations. The number DB 132 includes a number profile 134 for the client device 108. The number profile 134 generally includes different telephone numbers that are specific to the client device 108 and that can be used for making outgoing calls and/or receiving incoming calls for the client device 108. In this particular example, the number profile 134 includes a geographic phone number ("geographic number") 136 and a non-geographic phone number ("non-geographic number") 138. Generally, the geographic number 136 represents a telephone number that is associated with a particular geographic usage constraint. The geographic number 136, for instance, is only permitted to be used in a particular geographic region. The non-geographic number 138, however, represents a telephone number that does not have a geographic usage constraint. For example, the non-geographic number 138 may be utilized across a variety of different geographic regions.

According to various implementations, based on a current location of the client device 108, the number manager 128 can apply a call policy 130 based on the location to identify which of the geographic number 136 or the non-geographic number 138 from the number profile 134 to be used by the client device 108 for making a call. As used herein, "making a call" can refer to dialing out from the client device 108 and/or receiving a call at the client device 108 dialed from a different device.

In addition or alternative to the number DB 132 maintained by the number manager 128, the PSTN manager 112 may maintain a local PSTN database (DB) 140, which is representative of a local DB that the number manager 128 may utilize to perform various aspects of connectivity using a geographic phone number described herein. Generally, the PSTN DB 140 may be populated with information from the number DB 132. For instance, the number manager 128 can push information from the number DB 132 out to various entities, including the PSTN manager 112.

In at least some implementations, the number manager 128 can be implemented and/or managed by an entity such as by the communication service 104, the PSTN manager 112, a data network (e.g., wired and/or wireless), and so forth. Alternatively or additionally, the number manager 128 can be implemented as a standalone service for generating, managing, and/or communicating telephone number policies, telephone numbers, and so forth.

According to one or more implementations, instances of the call policies 130 can be configured based on information provided by and/or interaction with regulatory services 142. The regulatory services 142, for instance, represent government agencies that generate and apply regulatory policies 144. In at least some implementations, the regulatory services 142 include government agencies that regulate various aspects of communication in different geographical locations. Example functions of the regulatory services 142 include management of telephone numbering plans (including allocation and management of area codes, dialing codes, and so forth), management of wired and/or wireless communication resources, allocation of wireless bandwidth, and so on. As used herein, the term "area code" generally refers to a fixed-length or variable-length set of digits that are used to route calls to communications systems in specific geographic and/or political locations. Examples of an area code include a fixed-length 3 digit code such as used in the United States, Canada, a variable length code such as used in Germany and Japan, and so forth. Generally, an area code is not specific to a particular subscriber, but is used to route a call to a general region and may be associated with various geographical use restrictions, such as based on the regulatory policies 144.

The regulatory policies 144 are representative of policies that allocate communication resources for different purposes, and that specify various allowed and disallowed communication-related behaviors. In at least some implementations, the regulatory policies 144 define different geographic regions for different telephone numbers, such as area codes that are to be used for specific geographic locations. Further, the regulatory policies 144 may specify that telephone numbers with certain area codes may not be used outside of respective defined locations, such as defined by political boundaries, geographic coordinates, and so forth.

As mentioned above, instances of the call policies 130 can be configured based on interaction with the regulatory services 142. For instance, a particular regulatory policy 144 may specify that a certain area code is not permitted to be used outside of a geographical region defined for the area code. Thus, the number manager 128 can configure a particular call policy 130 to reflect that a telephone number with the area code is not to be used outside of the geographical region. The particular regulatory policy 144, for example, may specify that the geographic number 136 may not be utilized for making a call outside of a designated geographic region, such as defined by discrete geographic boundaries. Thus, as further described below, different phone numbers identified in the number profile 134 can be selected from completing calls for the client device 108 and based on the call policies 130.

Having described an example environment in which the techniques described herein may operate, consider now some example implementation scenarios for connectivity using a geographic phone number in accordance with one or more implementations.

Figure 2:
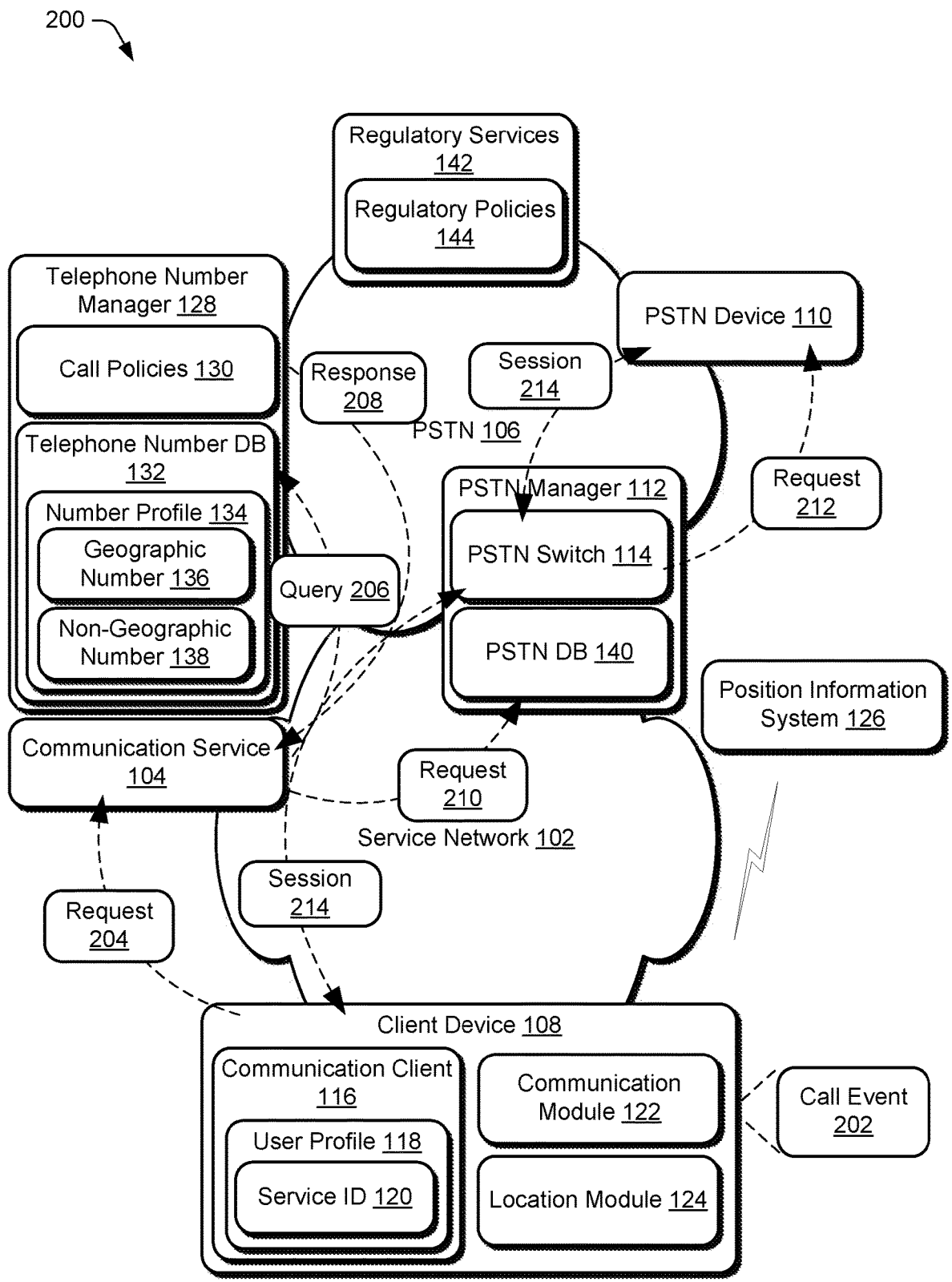
FIG. 2 depicts an example implementation scenario for connecting a call between a client device and a Public Switched Telephone Network (PSTN) device in accordance with one or more implementations.

FIG. 2 depicts an example implementation scenario 200 for connecting a call between a client device and a PSTN device in accordance with one or more implementations.

In the scenario 200, a call event 202 occurs which causes the client device 108 to initiate a call to the PSTN device 110. A user of the client device 108, for instance, dials a telephone number of the PSTN device 110. Based on the call event 202, the communication client 116 transmits a call request 204 to the communication service 104. Generally, the call request 204 indicates a request to connect a call between the client device 108 and the PSTN device 110, and includes various information such as the service ID 120, a telephone number for the PSTN device 110, and location information for the client device 108. The client device 108, for instance, determines its location via interaction with the position information system 126, and includes its location with the call request 204. In at least one implementation, the call request is an IP-based request that includes data packets with the various information pertaining to the call request 204.

The communication service 104 receives the call request 204 and determines based on the location information that the client device 108 is outside of a permitted geographical region for the geographic number 136. The communication service 104, for example, communicates a query 206 to the number manager 128, and the query 206 includes information such as the service ID 120 and the location of the client device 108. The number manager 128 performs a lookup in the number DB 132 and locates the number profile 134 for the client device 108. By comparing the location of the client device 108 and the geographic number 136 to a particular call policy 130, the number manager 128 determines that the client device 108 is currently located outside of a geographic region in which the geographic number 136 is permitted to be used. Accordingly, the number manager 128 returns a query response 208 to the communication service 104 that indicates that the client device 108 is outside of the permitted geographical region for the geographic number 136.

Accordingly, the communication service 104 initiates a connect request 210 to the PSTN manager 112 using the non-geographic number 138. As referenced above, the non-geographic number 138 is not associated with a geographic usage constraint, and thus may be used to make calls in a variety of different locations. In at least one implementation, the connect request 210 includes the non-geographic number 138 and the geographic number 136, and may optionally include the service ID 120. Alternatively or additionally, the PSTN manager 112 can perform a lookup in the PSTN DB 140 and/or a query to the number manager 128 to match the non-geographic number 138 to the geographic number 136. For instance, the PSTN manager 112 can query the number manager 128 and/or the PSTN DB 140 with the non-geographic number 138 to ascertain that the client device 108 has the number profile 134 associated with the communication service 104, and that the number profile 134 has the geographic number 136 to be used for connecting calls for the client device 108.

In at least one implementation, the PSTN switch 114 is in a geographic location in which the geographic number 136 is permitted to be used. Thus, the PSTN switch 114 communicates a call request 212 to the PSTN device 110 using the geographic number 136. The PSTN device 110 accepts the call request 212, and a communication session 214 is established between the client device 108 and the PSTN device 110. Generally, and as detailed below, a portion of the communication session 214 between the client device 108 and the communication service 104 is routed using IP communication, a portion of the communication session 214 between the communication service 104 and the PSTN switch 114 is routed using the non-geographic number 138, and a portion of the communication session 214 between the PSTN switch 114 and the PSTN device is routed using the geographic number 136. Accordingly, the PSTN device 110 identifies the communication session 214 as originating from the geographic number 136.

Generally, a call originating from the PSTN device 110 to the client device 108 would be handled in a similar way. For instance, the PSTN device 110 would dial the geographic number 136. The PSTN switch 114 would determine that the geographic number 136 is mapped to the user profile 118 and that the client device 108 is currently outside of the geographic area for the geographic number 136. The PSTN manager 112, for instance, can query the PSTN DB 140 and/or the number manager 128 with the geographic number 136. A response to the query can indicate that the client device 108 is currently outside the permitted geographic area for the geographic number 136, and that the client device 108 has the non-geographic number 138 which can be used for completing the call. Thus, the PSTN switch 114 could then route a call request to the non-geographic number 138 such that a communication session could be established between the PSTN device 110 and the client device 108.

In at least one implementation, the PSTN switch 114 can receive the call request from the PSTN device 110, can determine that the geographic number 136 is associated with a profile for the communication service 104 (e.g., via a query of the PSTN DB 140), and can notify the communication service 104 of the call request. The communication service 104 can then determine that the client device 108 is currently located outside of the permitted geographic area for the geographic number 136 (e.g., via a query to the client device 108), and can instruct the PSTN manager 112 to complete the call to the communication service 104 via the non-geographic number 138. The PSTN switch 114 then dials the non-geographic number 138 which connects the call to the communication service 104, which then completes the call via an IP-based call request to the communication client 116 of the client device 108.

Accordingly, techniques described herein enable a call to be connected for the client device 108 at least partially using the geographic number 136, even when the client device 108 is outside of a geographic area to which use of the geographic number 136 is constrained. Thus, the PSTN device 110 receives the communication session 214 as occurring with the geographic number 136. A called identifier (CID) received at the PSTN device 110, for instance, identifies incoming call media of the communication session 214 as originating from the geographic number 136, and not the non-geographic number 138.

In a different example scenario, consider that the client device 108 is located in a geographic region in which the geographic number 136 is permitted to be used. A particular call policy 130, for example, indicates that the geographic number 136 is permitted to be used by the client device 108 for placing a call at a current location of the client device 108. For instance, the communication service 104 determines that a current location of the client device 108 is a permitted location for using the geographic number 136, such as via the query 206 to the number manager 128. Accordingly, the communication service 104 can dial a call to the PSTN manager 112 using the geographic number 136, and the PSTN switch 114 can complete the call to the PSTN device 110 using the geographic number 136 to connect the communication session 214 between the PSTN device 110 and the client device 108.

Figure 3:
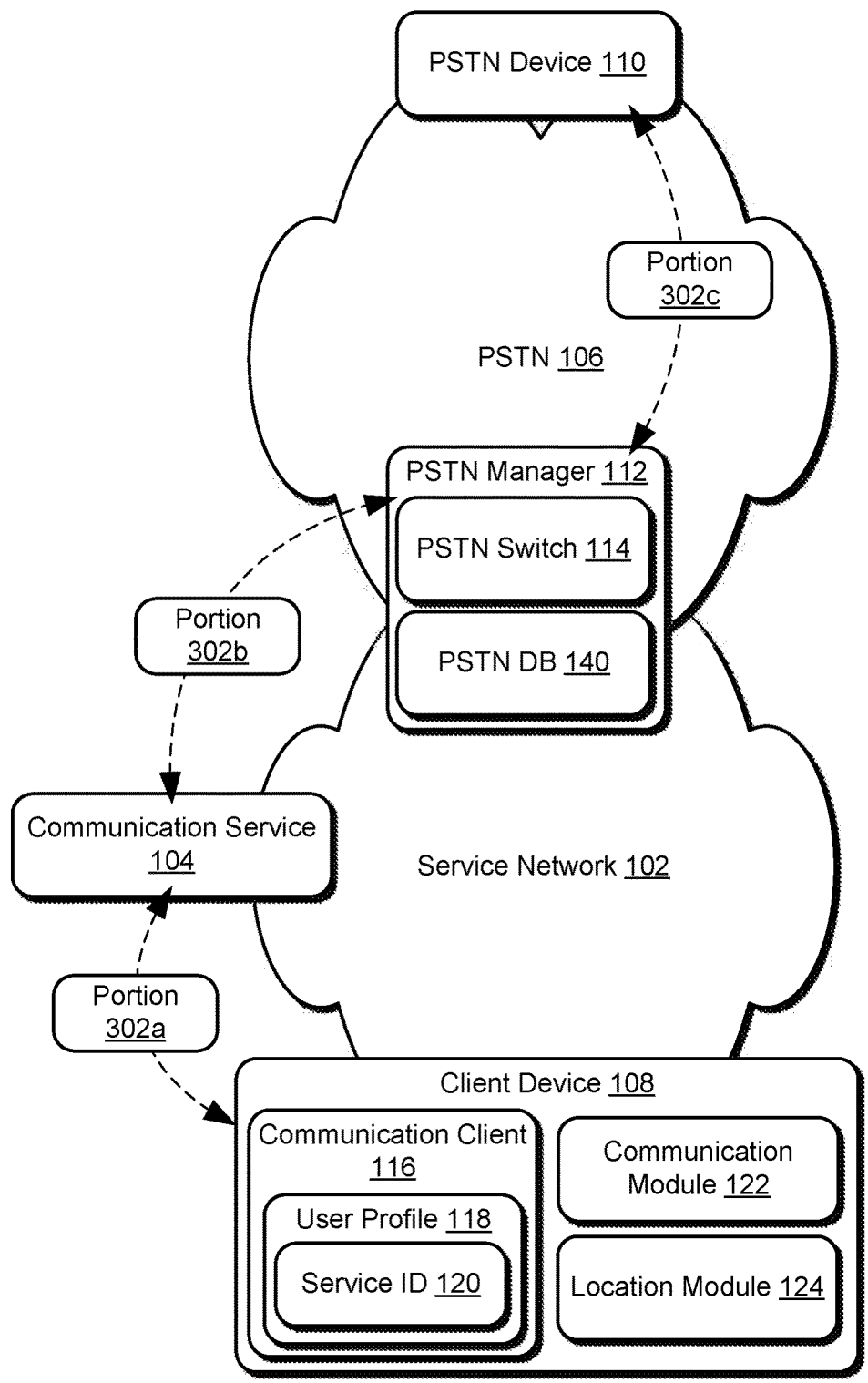
FIG. 3 depicts an example implementation scenario for connecting a call between a client device and a PSTN device in accordance with one or more implementations.

FIG. 3 depicts an example implementation scenario 300 for connecting a call between a client device and a PSTN device in accordance with one or more implementations. The scenario 300, for instance, represents a data flow for the communication session 214 discussed above.

The scenario 300 includes session portion 302a, a session portion 302b, and a session portion 302c. Generally, the session portions 302a-302c represent different data flows that combine to communicate media of the communication session 214 described above. For instance, the session portions 302a-302c represent bi-directional communication of call media between the client device 108 and the PSTN device 110.

The session portion 302a represents a connection between the client device 108 and the communication service 104. In at least one implementation, the session portion 302a represents an IP-based communication that includes data packets populated with call media and may include other types of data, such as call control information. In an incoming direction, for instance, the communication service 104 forwards call media received from the PSTN device to the client device via an IP communication.

Further, the session portion 302b represents an IP-based communication (e.g., a VoIP communication) between the communication service 104 and the PSTN switch 114. Finally, the session portion 302c represents a PSTN communication between the PSTN switch 114 and the PSTN device 110.

In an implementation where the client device 108 is located outside of a geographic region in which the geographic number 136 is permitted to be used, the session portion 302b is addressed using the non-geographic number 138 while the session portion 302c is addressed (e.g., dialed) using the geographic number 136. However, in an implementation where the client device 108 is located in a geographic location where the geographic number 136 is permitted to be used, both of the session portions 302b, 302c are addressed using the geographic number 136.

Accordingly, techniques described herein enable location information for a communication endpoint (e.g., the client device 108) to be used to determine whether a geographic number or a non-geographic number is to be used to connect a call to the communication endpoint. Further, when a portion of a call is connected from an endpoint device using a non-geographic number, the call can be completed to a called device using a geographic number such that the call appears to originate from the geographic number.

Having discussed some example implementation scenarios, consider now a discussion of some example procedures in accordance with one or more implementations.

The following discussion describes some example procedures for connectivity using a geographic phone number in accordance with one or more implementations. The example procedures may be employed in the environment 100 of FIG. 1, the system 800 of FIG. 8, and/or any other suitable environment. The procedures, for instance, represent example ways of performing various aspects of the scenarios described above. In at least some implementations, the steps described for the various procedures can be implemented automatically and independent of user interaction. Further, various steps of the procedures may be performed at the client device 108, at the communication service 104, at the number manager 128, at the PSTN manager 112, and/or via interaction between these entities.

Figure 4:
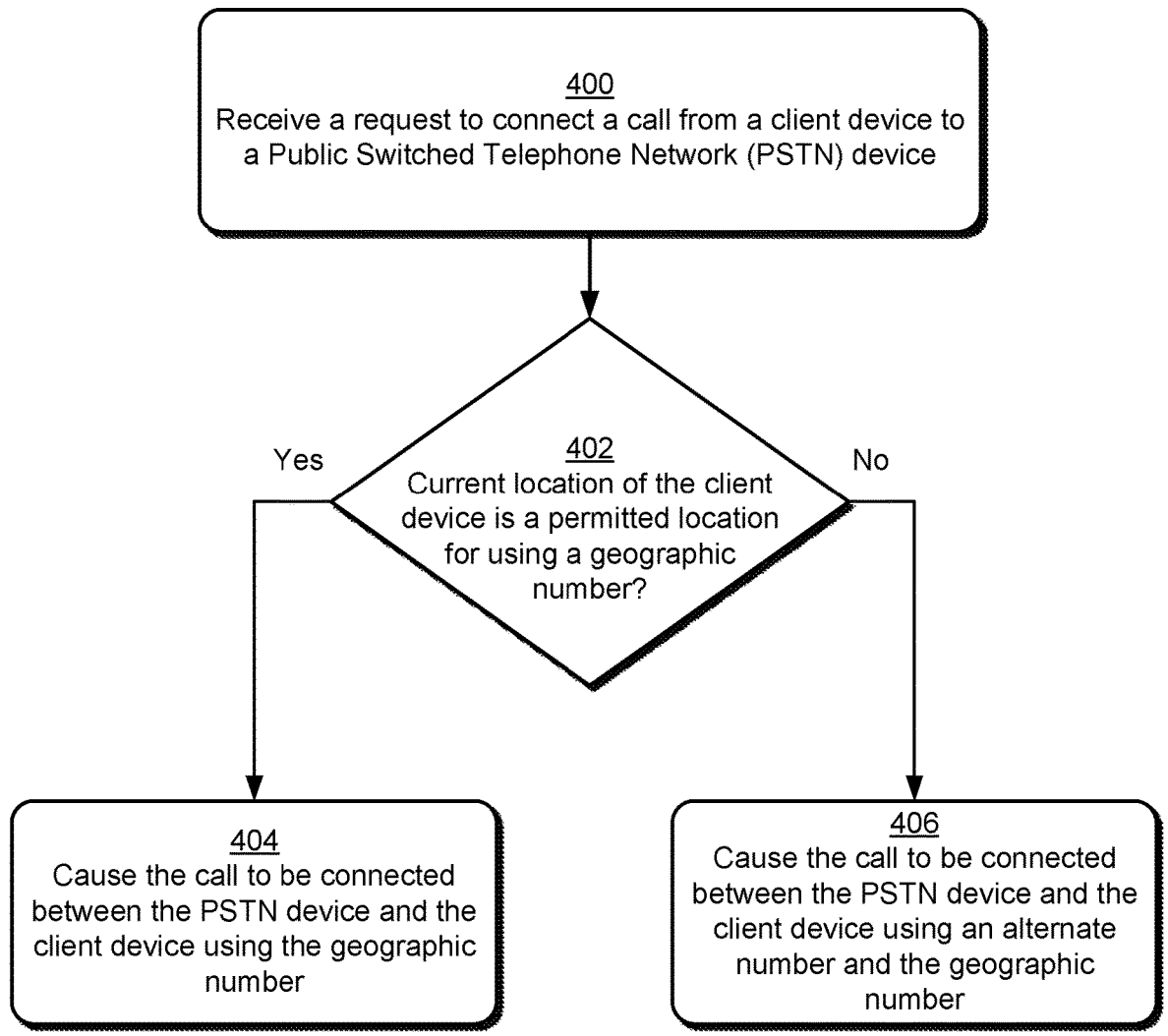
FIG. 4 is a flow diagram that describes steps in a method for connecting at least a portion of a call using a geographic number in accordance with one or more implementations.

FIG. 4 is a flow diagram that describes steps in a method in accordance with one or more implementations. The method, for instance, describes an example way of connecting at least a portion of a call using a geographic number.

Step 400 receives a request to connect a call from a client device to a PSTN device. For instance, the communication service 104 receives a call request from the client device 108 to call the PSTN device 110. In at least one implementation, the request is received as an IP-based communication from the client device 108.

Step 402 determines whether a current location of the client device is a permitted location for using a geographic number assigned to the client device. The communication service 104, for example, ascertains whether the client device 108 is located at a geographic location in which the geographic number 136 is permitted to be used. In at least one implementation, the communication service 104 can query the number manager 128 for this information. The number manager 128, for example, ascertains that the client device 108 is associated with the number profile 134, and thus the geographic number 136. The number manager 128 can then determine whether the geographic number 136 is permitted to be used at the current location of the client device 108, such as based on a call policy 130 that applies to the geographic number 136.

If the current location of the client device 108 is a permitted location for using the geographic number 136 ("Yes"), step 404 causes the call to be connected between the PSTN device and the client device using the geographic number. The communication service 104, for example, dials a telephone number of the PSTN device 110 using geographic number 136, which connects the client device 108 to the PSTN switch 114. The PSTN switch 114 then completes the call to the PSTN device 110 using the geographic number 136 as a calling device number for the call.

If the current location of the client device 108 is not a permitted location for using the geographic number 136 ("No"), step 406 causes the call to be connected between the PSTN device and the client device using an alternate number and the geographic number. In at least one implementation, the alternate number is a non-geographic number. The communication service 104, for example, dials the telephone number of the PSTN device 110 using the non-geographic number 138. This connects the call to the PSTN switch 114, which then completes the call to the PSTN device using the geographic number 136. Thus, call media of the call can be routed using both the non-geographic number 138 for a connection between the client device 108 and the PSTN switch 114, and the geographic number 136 for a connection between the PSTN switch 114 and the PSTN device 110. Generally, this causes the PSTN device 110 to receive incoming call media as originating from the geographic number 136.

Figure 5:
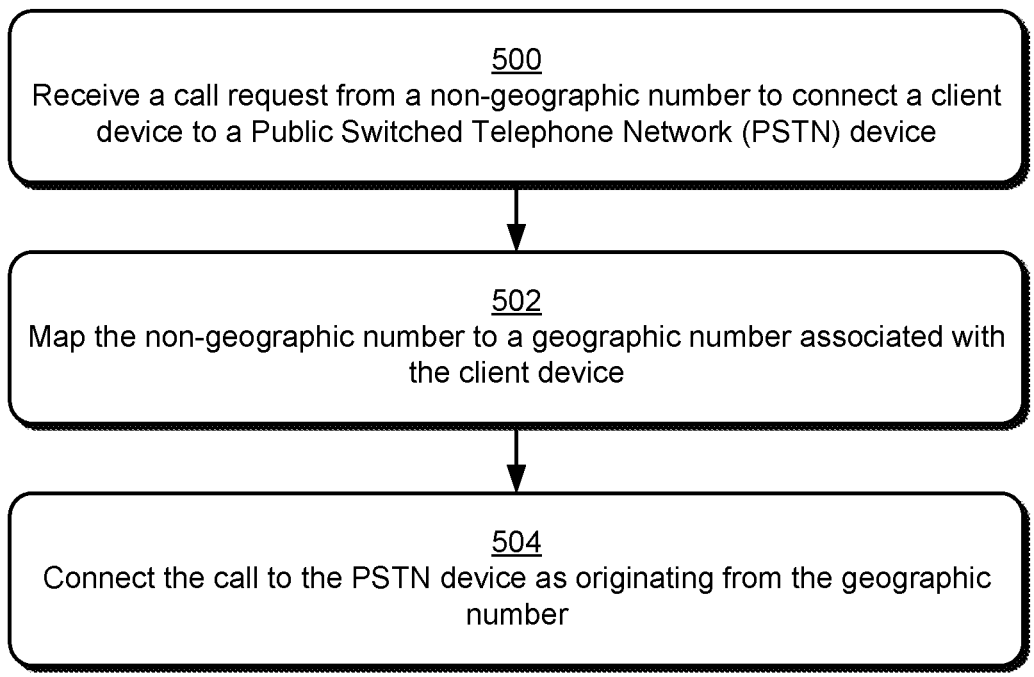
FIG. 5 is a flow diagram that describes steps in a method for connecting a call using non-geographic number and a geographic number in accordance with one or more implementations.

FIG. 5 is a flow diagram that describes steps in a method in accordance with one or more implementations. The method, for instance, describes an example way of connecting a call using non-geographic number and a geographic number.

Step 500 receives a call request from a non-geographic number to connect a client device to a PSTN device. The PSTN manager 112, for example, receives a call request from the communication service 104 dialed using the non-geographic number 138. Generally, the call request includes a telephone number for the PSTN device 110.

Step 502 maps the non-geographic number to a geographic number associated with the client device. For instance, the PSTN manager 112 queries the PSTN DB 140 and/or the number manager 128 with the non-geographic number 138. A response to the query indicates that the non-geographic number 138 is associated with a subscriber to the communication service 104 who has the geographic number 136.

Step 504 connects the call to the PSTN device as originating from the geographic number. The PSTN switch 114, for example, dials a telephone number of the PSTN device using the geographic number 136 as the calling phone number. Thus, the call is connected using the geographic number 136 between the PSTN switch 114 and the PSTN device 110, and the non-geographic number 138 between the PSTN switch and the client device 108.

Figure 6:
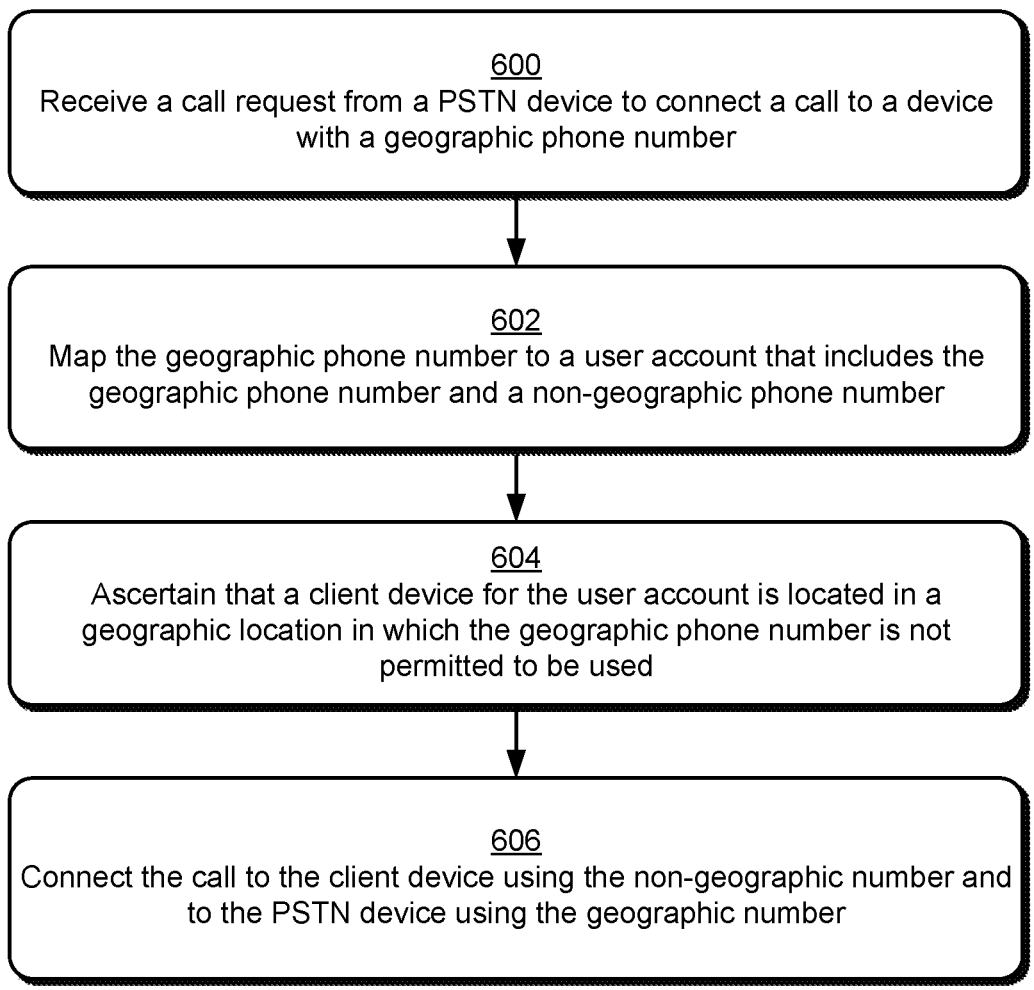
FIG. 6 is a flow diagram that describes steps in a method for connecting a call from a PSTN device using a geographic number and a non-geographic number in accordance with one or more implementations.

FIG. 6 is a flow diagram that describes steps in a method in accordance with one or more implementations. The method, for instance, describes an example way of connecting a call from a PSTN device using a geographic number and a non-geographic number.

Step 600 receives a call request from a PSTN device to connect a call to a device with a geographic phone number. The PSTN manager 112, for instance, receives a call request from the PSTN device 110 requesting to be connected to the geographic number 136.

Step 602 maps the geographic phone number to a user account that includes the geographic phone number and a non-geographic phone number. For example, the PSTN manager 112 queries the PSTN DB 140 and/or the number manager 128 to ascertain whether the geographic number 136 is associated with a user profile for the communication service 104. The PSTN manager 112 receives a query response indicating that the geographic number is associated with the user profile 118 for the communication service 104.

Step 604 ascertains that a client device for the user account is located in a geographic location in which the geographic phone number is not permitted to be used. For example, the query response mentioned above indicates that the client device 108 is currently located in a geographic location in which the geographic number 136 is not permitted to be used for call routing.

Step 606 connects the call to the client device using the non-geographic number and to the PSTN device using the geographic number. The PSTN switch 114, for instance, connects the call to the communication service 104 using the non-geographic number 138, while the call is connected to the PSTN device using the geographic number 136 as a routing number for call media from the client device 108. Thus, the call appears to the PSTN device 110 to be routed from the geographic number 136.

Figure 7:
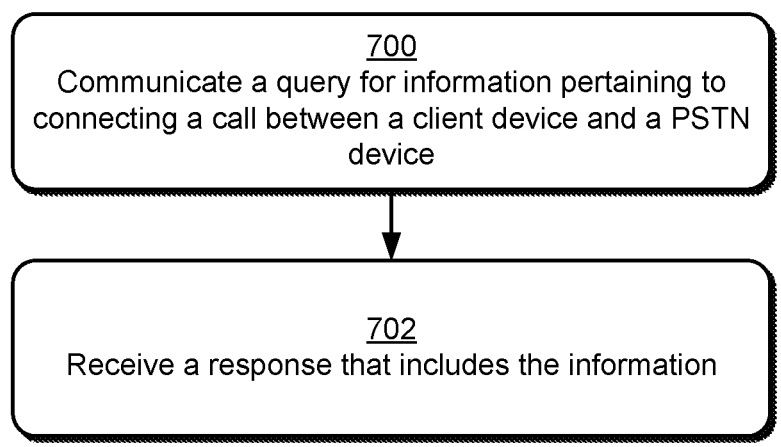
FIG. 7 is a flow diagram that describes steps in a method for obtaining information pertaining to a connecting a call in accordance with one or more implementations

FIG. 7 is a flow diagram that describes steps in a method in accordance with one or more implementations. The method, for instance, describes an example way for obtaining information pertaining to a connecting a call.

Step 700 communicates a query for information pertaining to connecting a call between a client device and a PSTN device. The communication service 104 and/or the PSTN manager 112, for instance, queries the number manager 128 for information pertaining to connecting a call. The query may request various information, such as a location of the client device 108, whether the client device 108 is located in a geographic region in which the geographic number 136 is permitted to be used, a geographic phone number and/or a non-geographic phone number for the client device 108, and so forth.

Step 702 receives a response that includes the information. For example, the communication service 104 and/or the PSTN manager 112 receive a response from the number manager 128 that includes the requested information. Thus, a call connection process can proceed based on the requested information, such as described above.

Thus, techniques for connectivity using a geographic phone number described herein enable devices to roam between different locations and engage in telephonic communication at the locations, which maintaining compliance with various policies that govern telephony at the different locations. Further, when a device that owns a geographic phone number is outside of a geographic location in which the geographic phone number is permitted to be used, techniques described herein enable both a non-geographic phone number and the geographic phone number to be used for call routing such that compliance with call policy for the geographic phone number is maintained, while another device involved in the call receives call media routed using the geographic phone number.

Having discussed some example procedures, consider now a discussion of an example system and device in accordance with one or more implementations.

Figure 8:
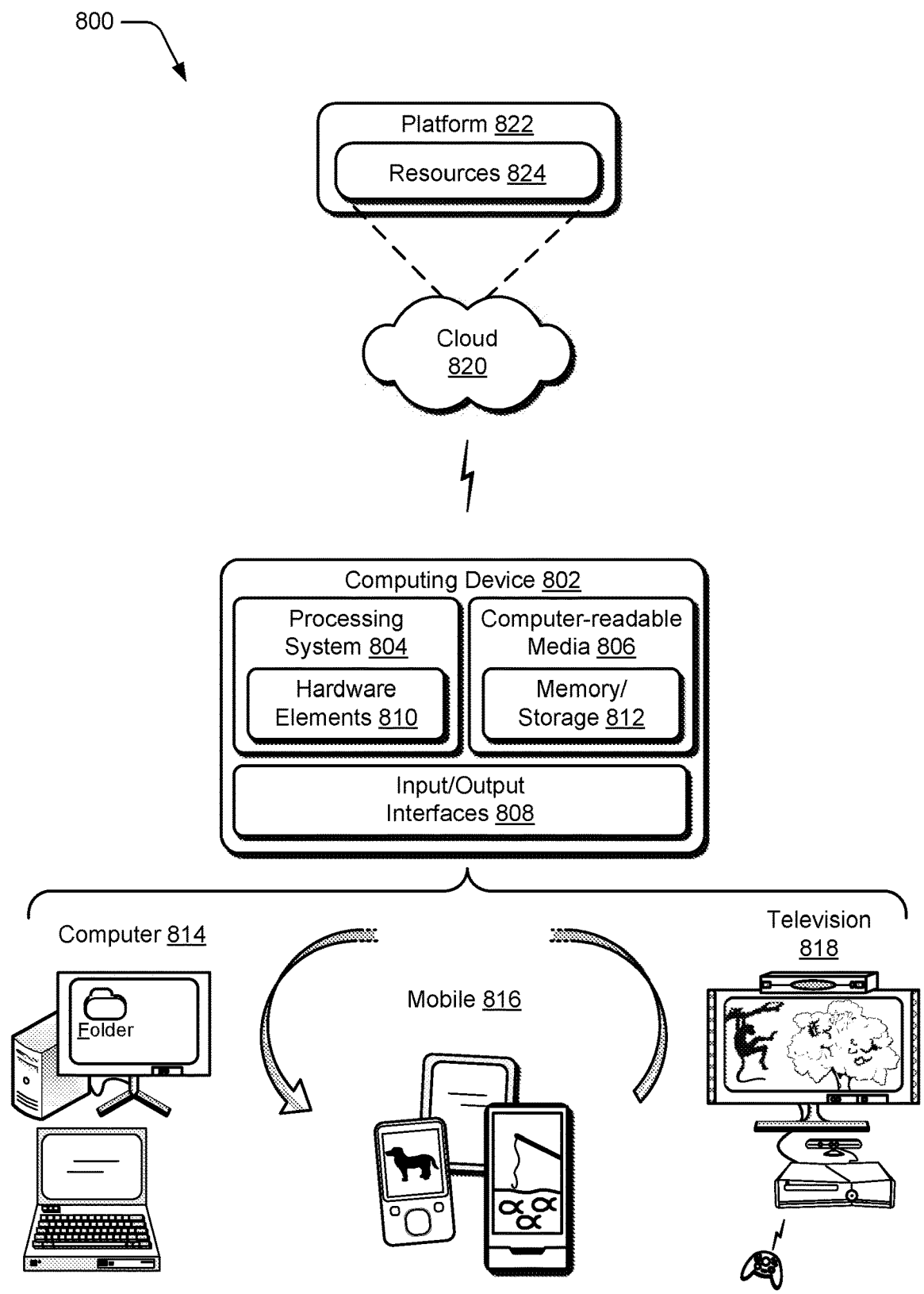
FIG. 8 illustrates an example system and computing device as described with reference to FIG. 1, which are configured to implement implementations of techniques described herein.

FIG. 8 illustrates an example system generally at 800 that includes an example computing device 802 that is representative of one or more computing systems and/or devices that may implement various techniques described herein. For example, the client device 108, the communication service 104, and/or the PSTN manager 112 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the number manager 128 and/or the number manager 128 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device implementation, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for connecting a call between a client device and a Public Switched Telephone Network (PSTN) device, the system including: at least one processor; and one or more computer-readable storage media including instructions stored thereon that, responsive to execution by the at least one processor, cause the system perform operations including: receiving a request to connect a call from a client device to a Public Switched Telephone Network (PSTN) device; determining whether a current location of the client device is a permitted location for using a geographic number assigned to the client device; and performing an action based on said determining, the action including one of: causing the call to be connected between the PSTN device and the client device using the geographic number based on a determination that the current location of the client device is a permitted location for using the geographic number; or causing the call to be connected between the PSTN device and the client device using an alternate number and the geographic number based on a determination that the current location of the client device is not a permitted location for using the geographic number.

In addition to any of the above systems, any one or combination of: wherein the request includes an Internet Protocol (IP) communication that includes one or more of an identifier of the client device or the location of the client device; wherein the alternate number includes a non-geographic number; wherein said determining includes querying a call policy that specifies one or more geographic locations where the geographic number is permitted to be used; wherein said determining includes querying a call policy that specifies one or more geographic locations where the geographic number is permitted to be used, and wherein the call policy is based at least in part on a regulatory policy that applies for one or more portions of the geographic number; wherein said determining includes: communicating a query that includes the location of the client device to a remote service; and receiving a query response indicating whether the current location is a permitted location for using the geographic number; wherein said determining includes determining that the current location of the client device is a permitted location for using the geographic number, and the action includes causing the call to be connected between the PSTN device and the client device using the geographic number including: routing call media from the client device to a PSTN network using the geographic number; and receiving call media from the PSTN device routed using the geographic number; wherein said determining includes determining that the current location of the client device is a permitted location for using the geographic number, and the action includes causing the call to be connected between the PSTN device and the client device using the geographic number including: routing call media from the client device to a PSTN network using the geographic number; receiving call media from the PSTN device routed using the geographic number; and forwarding the call media received from the PSTN device to the client device via an Internet Protocol (IP) communication; wherein said determining includes determining that the current location of the client device is not a permitted location for using the geographic number, and the action includes causing the call to be connected between the PSTN device and the client device using the alternate number and the geographic number including: routing call media from the client device to a PSTN network using the alternate number; and receiving call media from the PSTN device routed using the alternate number; wherein said determining includes determining that the current location of the client device is not a permitted location for using the geographic number, and the action includes causing the call to be connected between the PSTN device and the client device using the alternate number and the geographic number including: routing call media from the client device to a PSTN network using the alternate number; receiving call media from the PSTN device routed using the alternate number; and forwarding the call media received from the PSTN device to the client device via an Internet Protocol (IP) communication.

A computer-implemented method for connecting a call between a client device and a Public Switched Telephone Network (PSTN) device, the method including: receiving a call request from a non-geographic number to connect a client device to a Public Switched Telephone Network (PSTN) device; mapping the non-geographic number to a geographic number associated with the client device; and connecting the call to the PSTN device as originating from the geographic number.

In addition to any of the above described methods, any one or combination of: wherein said mapping includes querying a database to identify a user profile that includes the non-geographic number and the geographic number; wherein said mapping includes: ascertaining that the non-geographic number is associated with an account for a remote communication service; communicating a query that identifies the account to the communication service; and receiving the geographic number from the communication service; wherein the call request is received from a communication service, and wherein the method further includes: receiving call media from the communication service addressed using the non-geographic number; and forwarding the call media to the PSTN device as originating from the geographic number; wherein the call request is received from a communication service, and wherein the method further includes: receiving call media from the PSTN device addressed to the geographic number; and forwarding the call media to the communication service addressed using the non-geographic number.

A computer-implemented method for connecting a call between a client device and a Public Switched Telephone Network (PSTN) device, the method including: receiving a call request from a PSTN device to connect a call to a device with a geographic phone number; mapping the geographic phone number to a user account that includes the geographic phone number and a non-geographic phone number; ascertaining that a client device for the user account is located in a geographic location in which the geographic phone number is not permitted to be used; and connecting the call to the client device using the non-geographic number and to the PSTN device using the geographic number.

In addition to any of the above described methods, any one or combination of: wherein said mapping includes: ascertaining that the user account is associated with a communication service; querying the communication service with the geographic number; and receiving the non-geographic number from the communication service; wherein said ascertaining is based on a call policy that identifies one or more geographic locations in which the geographic phone number is permitted to be used; wherein the user account is associated with a communication service, and wherein said connecting includes communicating the call request to the communication service using the non-geographic number; wherein the user account is associated with a communication service, and wherein the method further includes: receiving call media from the PSTN device addressed to the geographic number; and forwarding the call media to the communication service addressed using the non-geographic number.

Techniques for connectivity using a geographic phone number are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A method comprising:
   establishing a first session portion using Internet Protocol (IP) communication between a calling device and a communications service;
   establishing a second session portion using IP communication between the communications service and a public switched telephone network (PSTN switch, the second session portion addressed via a non-geographic number of the calling device;
   establishing a third session portion using PSTN communication and a geographic number of the calling device between a PSTN switch and a callee device; and
   establishing a call between the calling device and the callee device via the first session portion, second session portion, and third session portion.

2. The method of claim 1, further comprising addressing the first session portion via the geographic number.

3. The method of claim 2, further comprising addressing the second session portion using a geographic number and addressing the third session portion using the geographic number.

4. The method of claim 1, further comprising determining a location of the calling device, and determining the geographic number is not permitted for use at the location, and wherein the addressing of the second session portion via the non-geographic number is in response to the determination.

5. The method of claim 4, wherein the determining that the geographic number is not permitted comprises transmitting a query to a remote service, the query indicating a location of the client device, and receiving, from the remote service, a response to the query indicating that the location is not a permitted location of the geographic number.

6. The method of claim 5, further comprising receiving a request to connect the call from the client device to the callee device.

7. The method of claim 1 wherein establishing the third session portion using PSTN communication comprises causing the PSTN to dial the geographic number at the PSTN.

8. The method of claim 1, wherein the establishing of the call between the calling device and the callee device comprises causing a portion of the call to be routed to the client device via the non-geographic number.

9. A system, comprising:
   hardware processing circuitry;
   one or more hardware memories storing instructions that when executed configure the hardware processing circuitry to perform operations comprising:
   establishing a first session portion using Internet Protocol (IP) communication between a calling device and a communications service;
   establishing a second session portion using IP communication between the communications service and a public switched telephone network (PSTN) switch, the second session portion addressed via a non-geographic number of the calling device;
   establishing a third session portion using PSTN communication and a geographic number of the calling device between a PSTN switch and a callee device; and
   establishing a call between the calling device and the callee device via the first session portion, second session portion, and third session portion.

10. The system of claim 9, the operations further comprising addressing the first session portion via the geographic number.

11. The system of claim 10, the operations further comprising addressing the second session portion using a geographic number and addressing the third session portion using the geographic number.

12. The system of claim 9, the operations further comprising determining a location of the calling device, and determining the geographic number is not permitted for use at the location, and wherein the addressing of the second session portion via the non-geographic number is in response to the determination.

13. The system of claim 12, wherein the determining that the geographic number is not permitted comprises transmitting a query to a remote service, the query indicating a location of the client device, and receiving, from the remote service, a response to the query indicating that the location is not a permitted location of the geographic number.

14. The system of claim 13, the operations further comprising receiving a request to connect the call from the client device to the callee device.

15. The system of claim 9, wherein establishing the third session portion using PSTN communication comprises causing the PSTN to dial the geographic number at the PSTN.

16. The system of claim 9, wherein the establishing of the call between the calling device and the callee device comprises causing a portion of the call to be routed to the client device via the non-geographic number.

17. A computer readable storage device comprising instructions that when executed configure hardware processing circuitry to perform operations comprising:
   establishing a first session portion using Internet Protocol (IP) communication between a calling device and a communications service;
   establishing a second session portion using IP communication between the communications service and a public switched telephone network (PSTN switch, the second session portion addressed via a non-geographic number of the calling device;
   establishing a third session portion using PSTN communication and a geographic number of the calling device between a PSTN switch and a callee device; and
   establishing a call between the calling device and the callee device via the first session portion, second session portion, and third session portion.

18. The computer readable storage device of claim 17, the operations further comprising determining a location of the calling device, and determining the geographic number is not permitted for use at the location, and wherein the addressing of the second session portion via the non-geographic number is in response to the determination.

19. The computer readable storage device of claim 18, wherein the determining that the geographic number is not permitted comprises transmitting a query to a remote service, the query indicating a location of the client device, and receiving, from the remote service, a response to the query indicating that the location is not a permitted location of the geographic number.

20. The computer readable storage device of claim 17, wherein the establishing of the call between the calling device and the callee device comprises causing a portion of the call to be routed to the client device via the non-geographic number.

* * * * *